United States Patent [19]
Knox

[11] 3,819,211
[45] June 25, 1974

[54] CONVEYOR SYSTEM
[75] Inventor: Harold L. Knox, Grosse Isle, Mich.
[73] Assignee: Detroit Stoker Company, Monroe, Mich.
[22] Filed: Mar. 26, 1973
[21] Appl. No.: 344,894

Related U.S. Application Data
[63] Continuation of Ser. No. 140,490, May 5, 1971, abandoned.

[52] U.S. Cl. ................................. 285/336, 285/363
[51] Int. Cl. ............................................ F16l 23/00
[58] Field of Search .......... 285/336, 363, 368, 364, 285/365, 366, 367; 277/225, 168

[56] References Cited
UNITED STATES PATENTS
| | | | |
|---|---|---|---|
| 2,070,291 | 2/1937 | McHugh | 285/368 X |
| 2,330,425 | 9/1943 | Hilton | 285/336 X |
| 2,725,079 | 11/1955 | Streed et al. | 285/336 X |
| 2,789,844 | 4/1957 | Kessler | 285/336 |
| 3,208,758 | 9/1965 | Carlson et al. | 285/336 X |
| 3,214,201 | 10/1965 | Fonda | 285/363 |

FOREIGN PATENTS OR APPLICATIONS
| | | | |
|---|---|---|---|
| 851,299 | 10/1939 | France | 285/336 |
| 454,048 | 4/1913 | France | 285/368 |

Primary Examiner—Thomas F. Callaghan
Attorney, Agent, or Firm—Harness, Dickey & Pierce

[57] ABSTRACT

This disclosure pertains to a seal assembly, which includes a sealing member having a primary and secondary sealing surface, which is adapted to provide a fluid tight joint between a pair of connecting members in a piping conveyor system and which increases in sealing effect in response to increases in internal pressure. The sealing member is adapted to be interposed between confronting surfaces of the connecting members and supported in complementary grooves therein to provide a piping joint having improved capabilities to withstand severe shock loads, hydraulic hammer, or the like.

2 Claims, 4 Drawing Figures

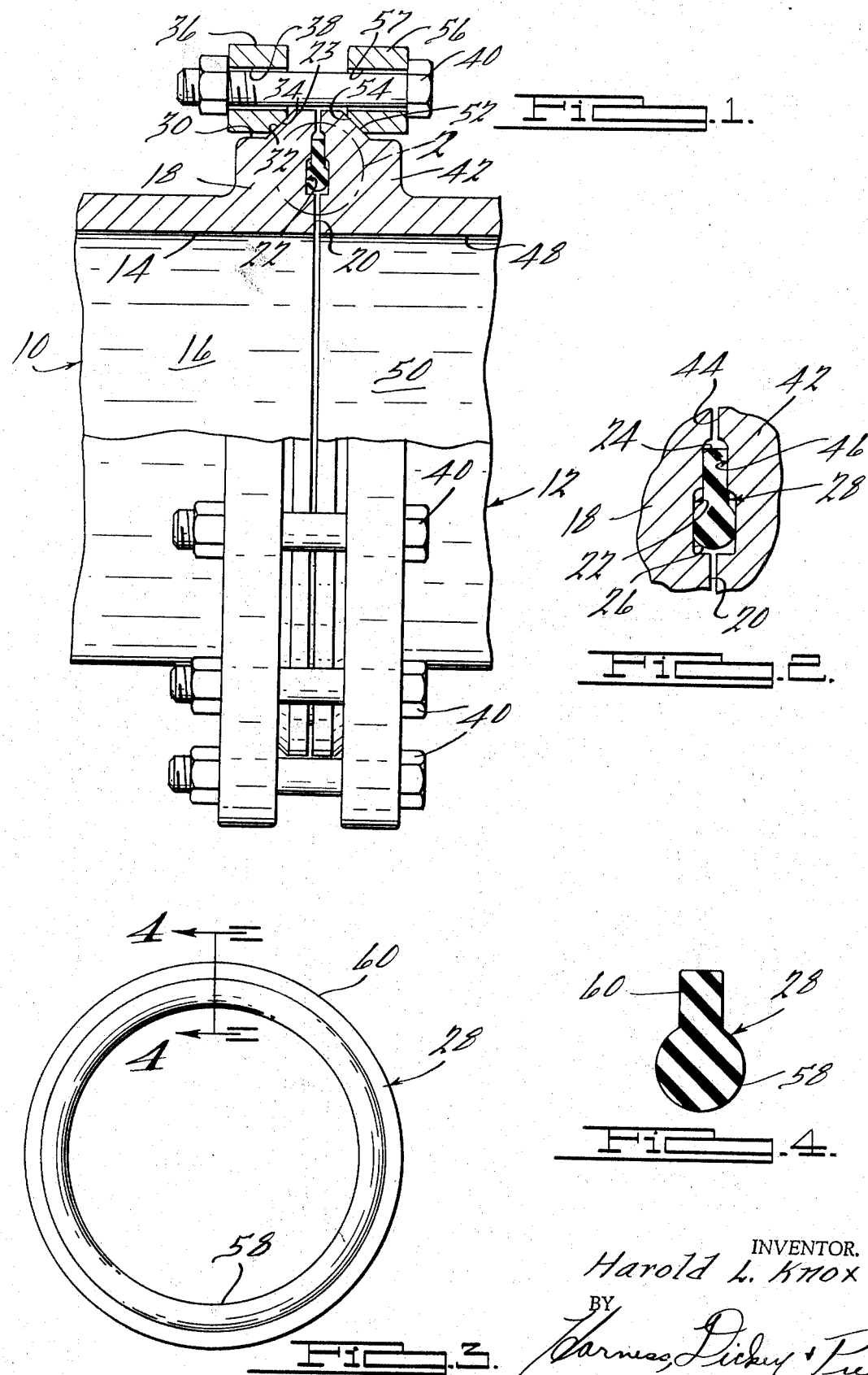

CONVEYOR SYSTEM

This is a continuation, division, of application Ser. No. 140,490, filed May 5, 1971 and now abandoned.

BACKGROUND AND SUMMARY OF THE INVENTION

This invention relates generally to piping systems, and more particularly to an improved seal assembly for use in forming a fluid tight joint at pipe connections in such systems.

In the transmission of materials, such as fluids, slurries, and solids, through piping conveying systems, a problem has been found to exist at locations wherein the flow stream is altered, restricted, or interrupted. Elbow locations in particular, when subjected to shock loads, hydraulic hammer or the like, are especially vulnerable to seal failure, and in some instances actual separation of the conveying system itself has been experienced.

In the past, pipe joints of conveying systems have generally been comprised of either mechanical couplings, or flanged end pipe members or fittings. In the latter, a flat rubber gasket or the like is located between confronting faces to provide a seal. When subjected to the loading enumerated above, however, the seal has been found to fail or "blow" resulting in a leak. In the mechanical coupling type piping system, the same type of loading has been found to produce actual separation of the components at the joint. The subject seal assembly is addressed to providing a pipe joint free from either of the failures indicated above, and having enhanced capabilities for withstanding severe shock loads, hydraulic hammer, or the like.

The subject seal assembly is comprised of a resilient sealing member, having primary and secondary sealing portions, which is adapted to be supported in a generally "T" shaped groove, defined by complementary grooves in each of the confronting flange faces. The primary portion is substantially circular in cross section and includes a surface portion which is adapted to be in fluid communication with the material flowing through the system whereby an increase in sealing effect is provided in response to an increase in fluid pressure. The outer radial sides of the primary portion are adapted to be initially compressed and deformed to assume a shape conforming to the inner radial wall of the complementary grooves as the flanges are initially drawn together under the influence of a plurality of flange connecting bolts. As the flanges are further drawn together, the secondary portion is subsequently seated and compressed, providing for a substantial contacting secondary sealing surface between the grooves. To minimize flange failure, the plurality of flange bolts connect a pair of split ring collars, which are adapted to encircle each of the flange ends, and react against a conforming surface on the flange itself.

Accordingly, it is a primary object of the present invention to provide an improved seal assembly for use between confronting flanges.

It is another object of the present invention to provide a seal assembly having a resistance to shock loads and hydraulic hammer.

It is still another object of the present invention to provide a seal assembly which is adapted to be self-tightening.

It is yet another object of the present invention to provide a seal assembly wherein the stresses in the flanges are minimized during the tightening of the flange connecting bolts.

It is still another object of the present invention to provide a seal assembly which is easy to assembly, reliable in operation, and inexpensive to manufacture.

Further objects, features and advantages of this invention will become apparent from a consideration of the following description, the appended claims, and the accompanying drawings.

DETAILED DESCRIPTION OF THE DRAWINGS

FIG. 1 is a partial cross-sectional view of a preferred embodiment of the present invention relative to the connecting end portions of a first and second piping member.

FIG. 2 is an enlarged cross-sectional view of the sealing member of FIG. 1 included in the dot-dash lines indicated by the numeral 2.

FIG. 3 is a transverse elevational view of the sealing member of FIG. 1.

FIG. 4 is a cross-sectional view of the sealing member illustrated in FIG. 3 taken along the line 4—4 thereof.

DETAILED DESCRIPTION OF THE PREFERRED EMBODIMENT

With reference now to FIG. 1 of the drawings, a first piping member 10 is illustrated in fluid tight engagement with a second piping member 12 in accordance with the preferred exemplary embodiment of the present invention. The piping members 10 and 12 may be sections of pipe, pipe fittings, piping components or appurtenances, or a combination thereof having suitably formed flanged ends as shall hereinafter be described.

The first piping member 10 has a bore 14 which defines a flow passage 16 for transmission therethrough of any suitable material. At the outer end of the member 10, a flange 18 extends radially outward and includes a substantially flat outer face 20 having an annular stepped groove 22 suitably located between the bore 14 and an outer peripheral surface 23 of the flange 18. As best observed in FIG. 2, the annular stepped groove 22 is comprised of a first annular portion 24 and a second annular portion 26, circumjacent with the first, and extending axially inward from the first portion 24 to define a step therewith. Preferably, the axial depth of the groove 22 is approximately twice the depth of the groove 24. As shall subsequently be described, the annular stepped groove 22 is adapted to receive a ring shaped resilient sealing member 28.

The flange 18 further includes a second annular outer surface 30, of less diameter than the annular surface 23, and an annular inclined wall 32 which extends between the annular surfaces 23 and 30. The inclined wall 32 is adapted to be engaged by a generally conforming inclined surface 34 on a split collar ring member 36. The collar ring member includes a plurality of radially spaced axially extending bores or bolt holes 38 which are adapted to receive suitable connectors 40, i.e., bolts, nuts, studs, etc.

The second piping member 12 also includes a flange 42 disposed on one end thereof. The flange 42 is of similar construction as the flange 18 and includes an outer face 44 having a stepped groove 46 which is adapted to complement the stepped groove 22 to define an annular passage of generally "T" shaped cross section when the faces 20 and 44 are in confrontation.

Correspondingly, the second member has a bore 48 which defines a flow passage 50, and an inclined wall 52 which engages a corresponding inclined annular surface 54 on a second split collar member 56. The second split collar member 56 is similar to the collar member 36 and includes a plurality of radially spaced bolt holes 57 which are adapted to axially align with the bolt holes 38 of the first collar member 36 for receiving the connectors 40.

As best observed in FIGS. 3 and 4, the sealing member 28 is ring shaped and includes a radially inward portion 58 of circular cross section which functions as a primary seal, and a radially extending outward portion 60 of rectangular cross section which functions as a secondary seal. The cross-sectional diameter of the inward portion 58 is suitably selected relative to the cross-sectional width of the outward portion 60, so that in the assembly of the joint, the portion 58 will be engaged by the complementary grooves 22 and 46 prior to the engagement of outer portion 60. Preferably, the cross-sectional width of the rectangularly shaped portion 60 approximates the radius of the circular portion 58. With respect to materials, the sealing member 28 can be formed from any suitable resilient material and for general application Buna-N has been found acceptable.

In assembling the members 10 and 12, the seal member 28 is disposed in one of the stepped grooves 22 or 46, and the confronting face of the other member is aligned therewith. The split collar members 36 and 56 are loosely supported by the inclined walls 32 and 52 of the flanges 18 and 42, respectively, and suitably aligned to receive the connectors 40. As the connectors 40 are tightened, drawing the flanges 18 and 42 together, it will be noted that radial side walls of the circular portion 58, which are initially circular in cross section deform and flatten against the inner radial wall of the stepped grooves 22 and 46. Additional tightening of the connectors 40 compresses the rectangular portion into engagement with the grooves 22 and 46, and as best observed in FIG. 2, the primary seal, comprised of the inner circular portion 58, provides substantial surface contact with the stepped grooves 22 and 46. It will also be noted that the inner annular surface of the inward portion 58 of the seal member 28 is in fluid communication with the material, or fluid, flowing through the flow passage 16 and 50 of the members 10 and 12 respectively, by means of a gap as defined by the confronting faces 20 and 44 thereof. The pressure of the fluid or material flowing in the passages 16 and 50 is adapted to react against the inner annular surface of the member 28 to increase the surface pressure between the deformed radial walls of the sealing member 28 and the stepped grooves 22 and 46 defined between the flanges to provide a self-tightening, self-sealing feature. Additionally, due to the deformable nature and configuration of the sealing member 28 within the grooves 22 and 46, the sealing member has been found to have the capability of resisting hydraulic hammer or severe shock loads imposed on the joint.

An additional advantage of the seal assembly resides in the fact that in many hydraulic conveyor systems, it has been found desirable to cast the member fittings, or components, from a very hard iron. The use of hard iron, however, makes it impractical to machine the seal faces, and generally speaking, it is common that such faces are not machined. The subject seal assembly, and complementary grooves, afford substantial advantage with such castings since the outer flange faces do not have to be precisely coplanar to support the seal in order to form a fluid tight joint. Additionally, due to the relatively larger cross-sectional width of the seal member 28, the member 28 is suitable to provide some slight adjustment in the axial orientation of the members 10 and 12, which affords an advantage in assembling the piping system.

Another feature of the present invention resides in the use of the split collar rings 36 and 56 which cooperate with the flanges 18 and 42 of the members 10 and 12. In prior systems wherein the bolt holes were located in the flange itself, the flange was susceptible to breakage during the initial tightening of the connectors. In the subject invention, it will be noted that if one of the connectors is initially tightened to cause a substantial bending stress in the flanges, the bending force reacts over an enlarged peripheral surface along the inclined walls 32 and 52 which reduces its susceptibility to fracture. When the bolt holes are located in an integral flange, the bending force reacts on a considerably less portion of the flange material resulting in substantially higher stresses.

While it will be apparent that the preferred embodiment illustrated herein is well calculated to fulfill the objects above stated, it will be appreciated that the present invention is susceptible to modification, variation and change without departing from the scope of the invention.

What is claimed is:

1. A sealed joint structure for the abutting ends of fluid conductive components designed to withstand internal pressure, comprising two components having end portions with confronting generally planar end faces, each of said end faces having a relatively shallow, annular, flat-bottomed groove extending axially thereinto and joined by a shoulder to a radially outer part of the end face and having a deeper annular flat-bottomed groove positioned radially inwardly of but adjacent the first mentioned groove and joined thereto by a shoulder, the flat bottoms of said grooves being substantially parallel to each other, the grooves on each of the components being of like dimensions radially and axially and adapted to open toward one another in confronting relation to form an annular pocket of generally T-section between the abutting ends of the components, with the axially wider portion of the pocket formed by the deeper grooves located radially inwardly of an axially narrower portion thereof formed by the shallower grooves, an annular elastic sealing element in the pocket, said sealing element having a substantially toroidal solid radially inner section which is of an axial diameter exceeding twice the axial depth of a single one of the deeper grooves and adapted to be held in and between such deeper grooves, said sealing element also having an integral rib-like outward extension section located on the central plane of the torus and of an axial thickness exceeding twice the depth of a single one of the shallower grooves and adapted to be held in and between said shallower grooves, the inwardly facing inner surface of said substantially toroidal inner section being completely circular peripherally and defining a complete O-ring except for said rib-like extension, the volume of the axially wider portion of the pocket exceeding the volume of the portion of the sealing element contained therein, and means for securing the components together with the planar faces slightly spaced from one another and with the sealing element trapped in the pocket, both sections of the sealing element being axially compressed between the bottoms of the respective grooves in which they are held, whereby the shoulders restrain the respective sections of the sealing element against outward extrusion through the space between the planar faces.

2. A joint structure as defined in claim 1 wherein the difference between the axial thickness of the torus and the combined depth of the two deeper grooves is greater than the difference between the axial thickness of the rib-like extension and the combined depth of the shallower grooves, whereby the extent of axial compression of the inner section of the sealing element is greater than the extent of axial compression of the outward extension section.

* * * * *